Figure 1:
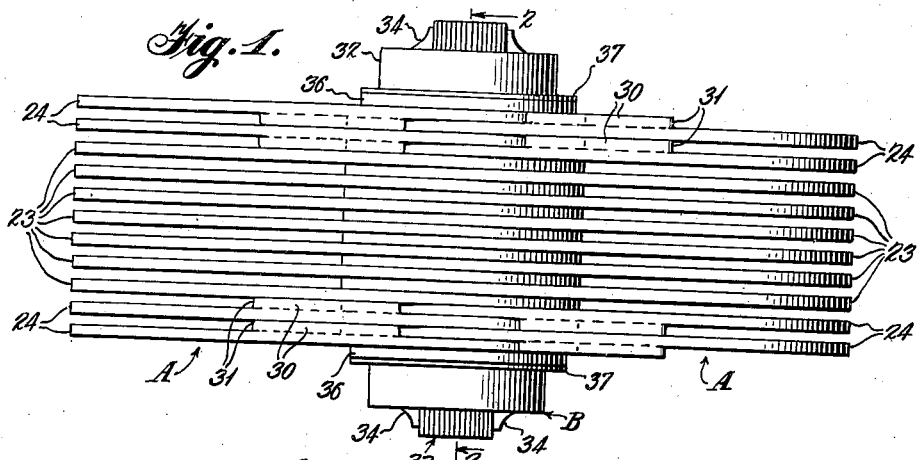

Dec. 16, 1941.  H. G. KELLER  2,266,688
POWER TRANSMISSION CHAIN
Filed Aug. 26, 1940   5 Sheets-Sheet 1

Inventor
Henry G. Keller
By L. Ronald Ungen
Attorney

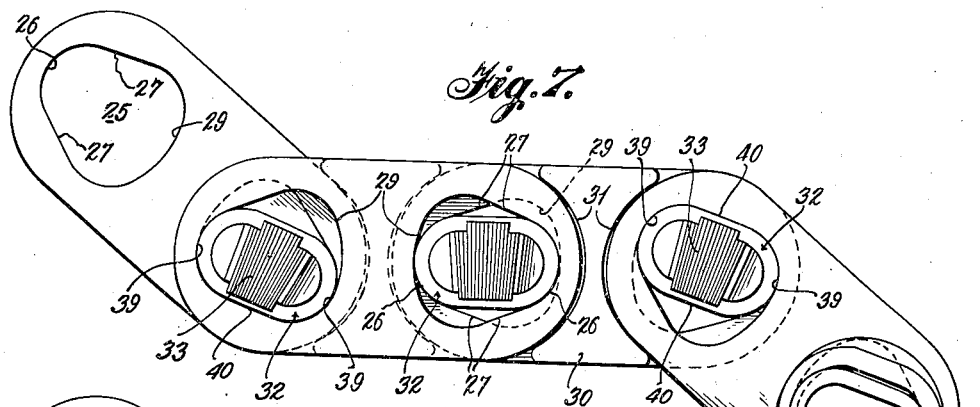
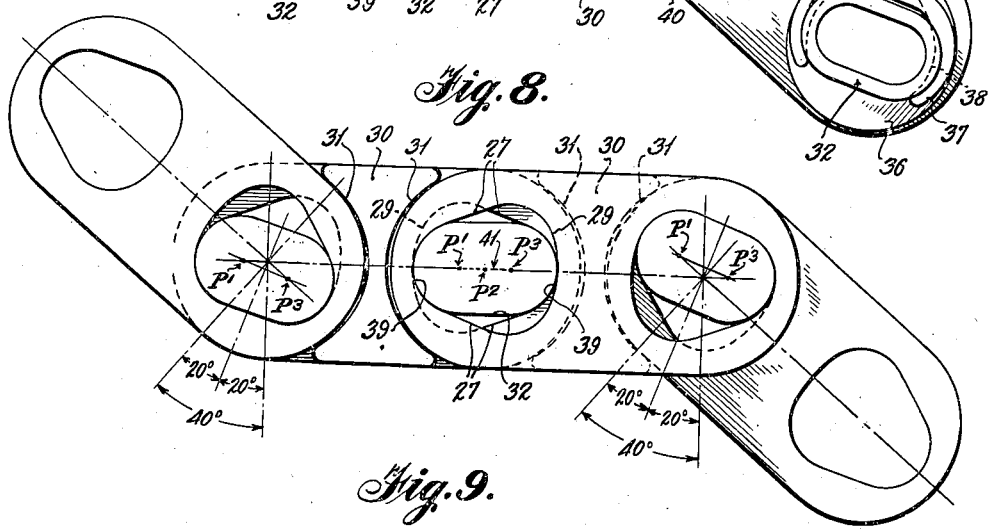
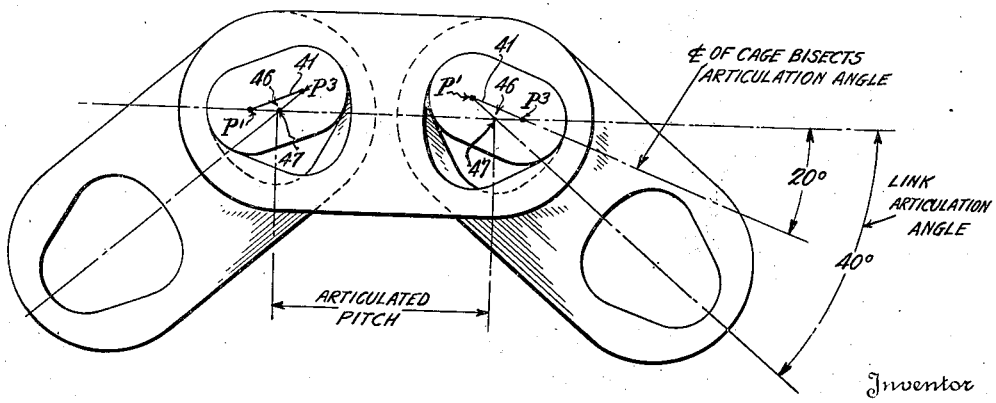

Dec. 16, 1941.  H. G. KELLER  2,266,688
POWER TRANSMISSION CHAIN
Filed Aug. 26, 1940   5 Sheets-Sheet 3
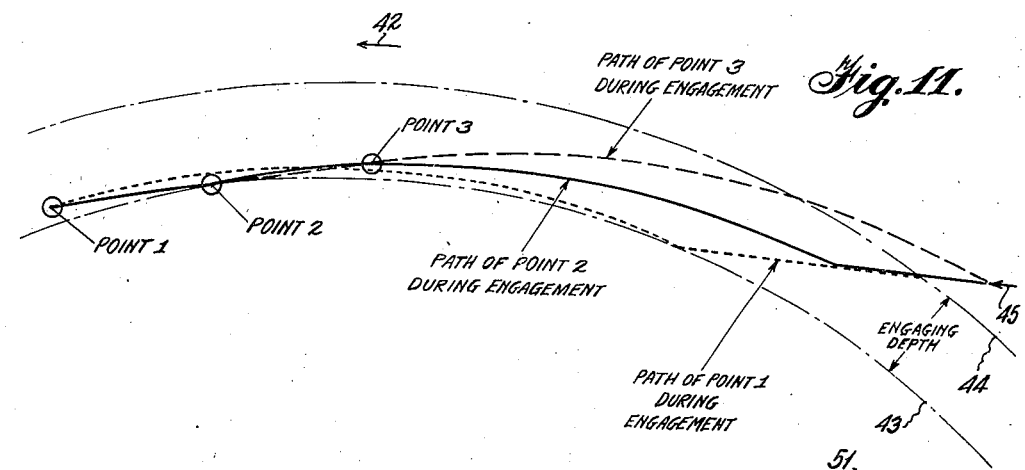
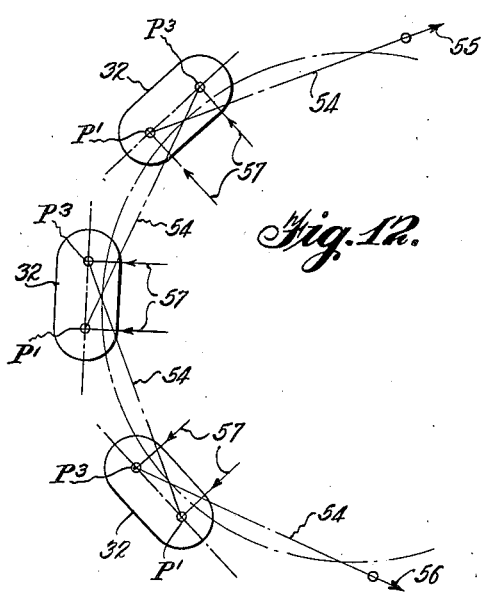
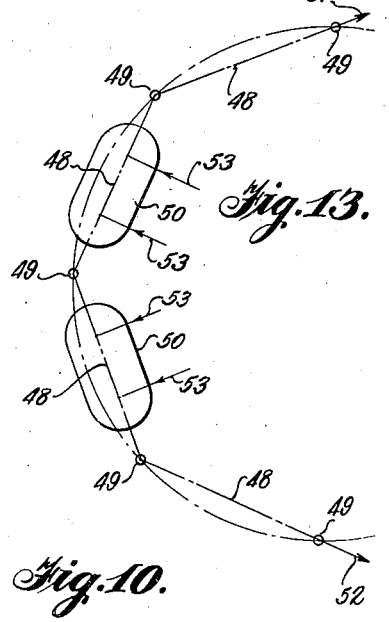
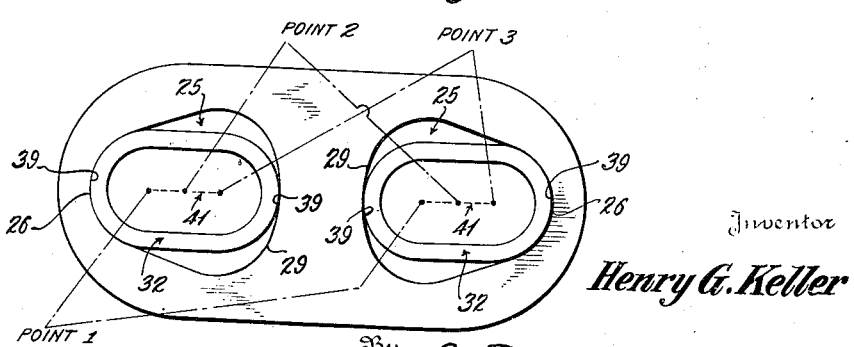
Inventor
Henry G. Keller
By L. Donald Vargas
Attorney

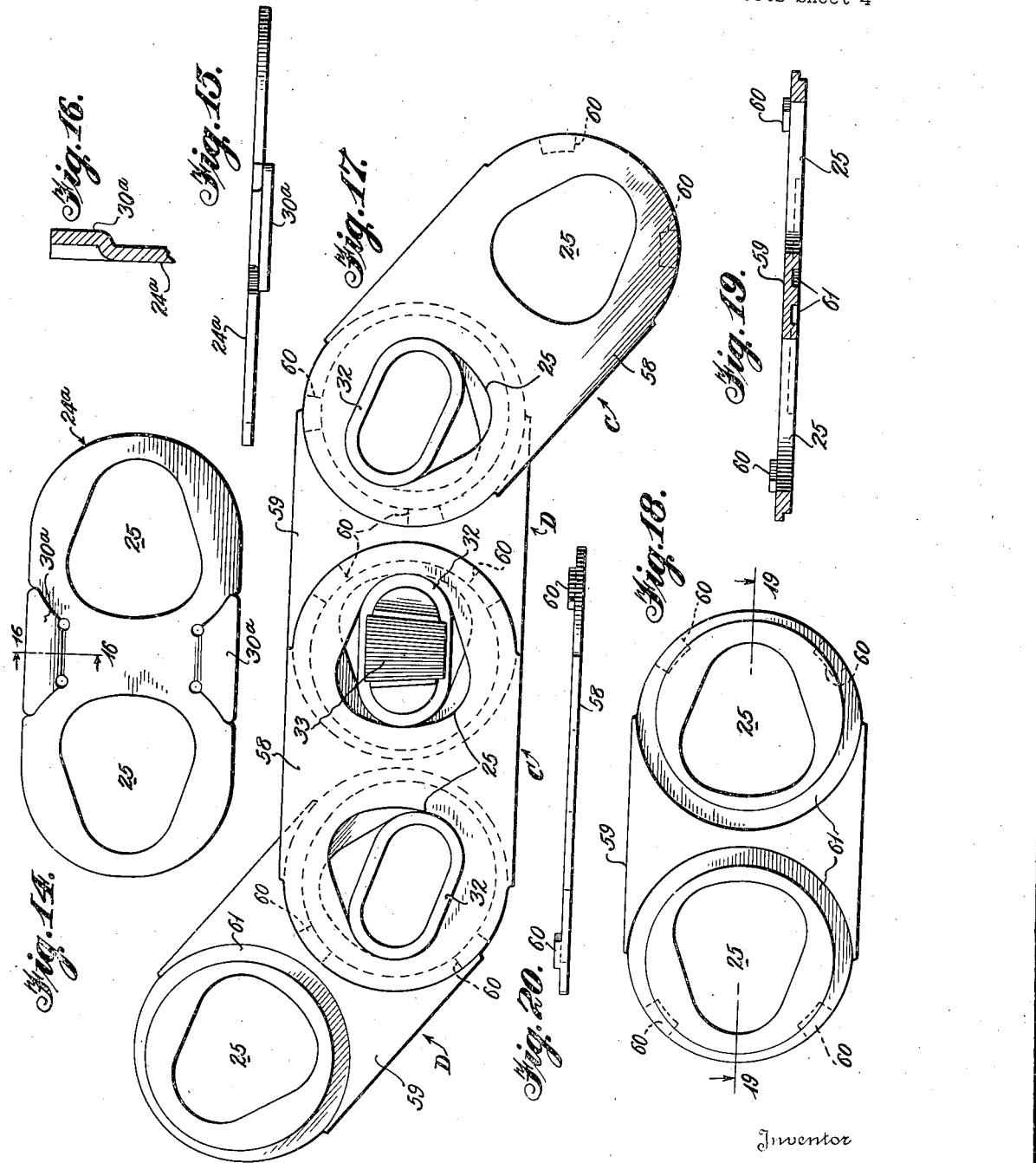

Dec. 16, 1941.  H. G. KELLER  2,266,688
POWER TRANSMISSION CHAIN
Filed Aug. 26, 1940　　5 Sheets-Sheet 5
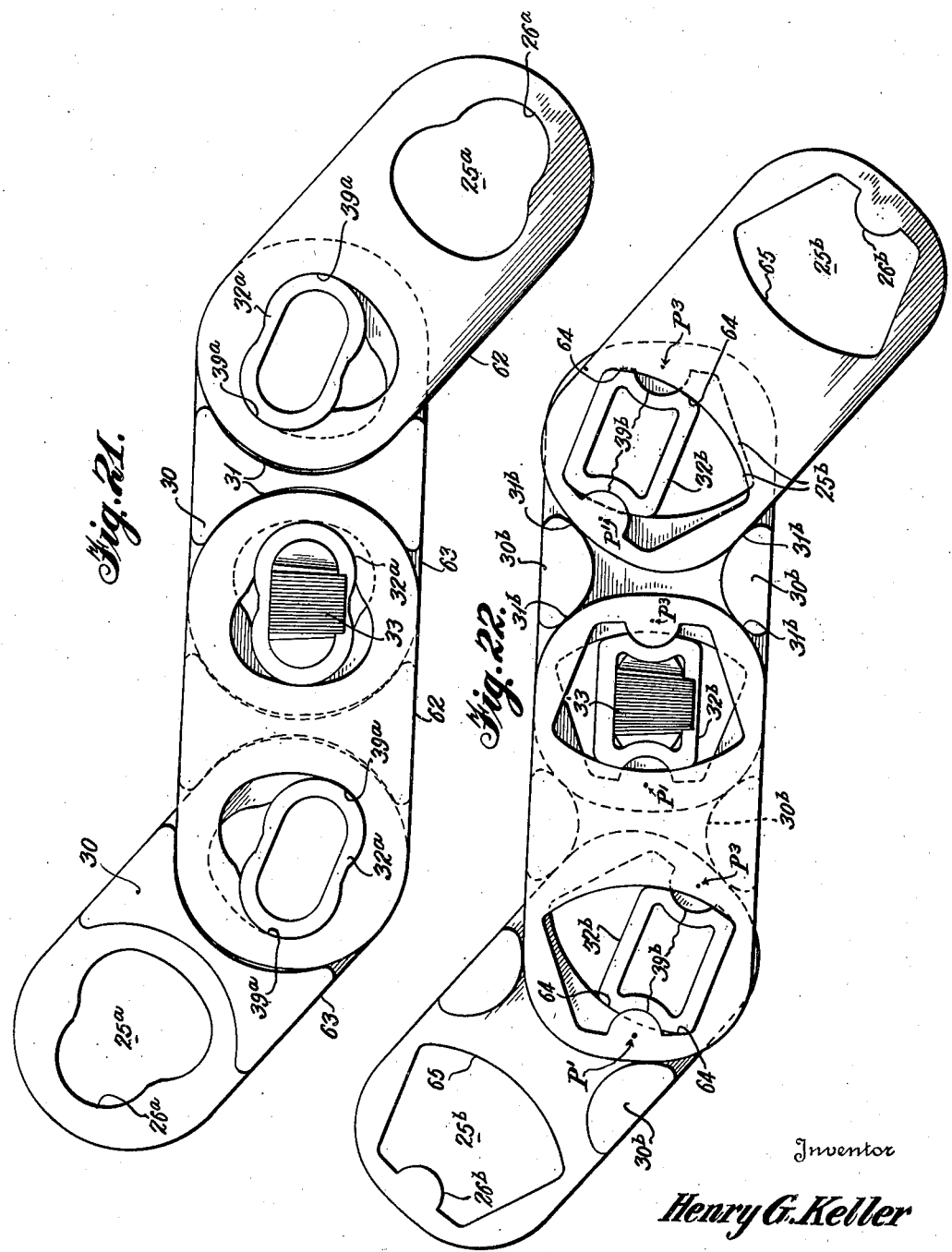
Inventor
Henry G. Keller
By L. Donald Unger
Attorney Patented Dec. 16, 1941

2,266,688

UNITED STATES PATENT OFFICE 2,266,688

POWER TRANSMISSION CHAIN

Henry G. Keller, Glenside, Pa., assignor to Link-Belt Company, a corporation of Illinois Application August 26, 1940, Serial No. 354,270

30 Claims. (Cl. 74—245)

This invention relates to new and useful improvements in power transmission chains, particularly of the V-type in which slats are employed to provide side engagement with the toothed faces of opposed conical wheels. Certain of the improvements, however, are applicable to other types, for example silent chains.

Conventional power transmission chains of the side engaging type employing slats to mesh with the toothed faces of V-pulleys are formed of links which are pivotally connected at their adjacent ends by the chain pins. Each link consists of a series of parallel link plates centrally cut away to provide a common transverse opening to receive a group or pack of slats enclosed in a cage or frame. The ends of the slats contact the opposed faces of the toothed conical wheels which form the V-pulleys and, as a result of such engagement, the slats are displaced transversely in opposite directions to collectively adapt themselves to the contours of the toothed faces of the wheels.

With such an arrangement, it is obvious that each link is supported by the slats of its pack at and near the center of its chord and that the tension which provides the engaging forces is delivered to the link at its ends through the chain pins. Since the tension loads at the two ends of a link passing around a pulley are never equal and since they vary as the link progresses around the pulley, the whole link has a tendency to rock about its points of support, which are at and near the center of its chord, until equilibrium is established. This delay in establishing equilibrium provides a very unstable seating action when the links are running onto a pulley.

One of the primary objects of this invention is to provide power transmission chains of the side engaging, slat pack type which will entirely overcome this lack of stability in conventional designs. Very broadly stated, this highly desirable result is accomplished by employing the slat pack cages or frames as the chain pins which pivotally connect adjacent links.

Generally speaking, all chain manufacturers are constantly on the lookout for ways and means of providing smoother action for power transmission chains. It is a well recognized fact that the length of the pitch of a chain has a direct bearing on the type of chain action obtained. The shorter the pitch, the smoother the chain action, and this is due to the fact that a shorter pitch gives less chordal action because more pitches will contact the wheels for a given radius.

In conventional power transmission chains of the type being considered, the location of the slat packs between the chain pins, or at the centers of the chords, will necessitate a reduction in the total slat contact area for every reduction in pitch. Of still greater importance is the fact that the rate of reduction in slat contact area exceeds the rate of reduction in pitch.

Another primary object of this invention is to provide power transmission chains of the aforementioned type which will permit the pitch to be reduced without the aforementioned disproportionate reduction in slat contact area. This improvement is obtained by employing specially shaped slat pack cages or frames as the chain pins and by controlling the chain joint action so that the links will articulate about compound centers. This action of shortening the pitch is accomplished in such a way that the articulation pitch is less than the actual pitch of the chain link and this difference between the two mentioned pitches varies with the angle of articulation. The greater the articulation angle, the shorter the articulation pitch.

As this pitch shortening action is not dependent in any way on the use of slat packs as the sprocket engaging medium, and as side engagement of the chain with the sprocket is not essential, it will be appreciated that this feature may be incorporated in power transmission chains of the radial engagement type, for example silent chains. However, the controlling of the chain joint action to cause articulation of the links about compound centers and the shortening of the pitch produces a desirable result which is peculiar to slat pack, side engaging chains. This result is that the compensating action which takes place during articulation of a joint causes the slat pack incorporated in the joint to swing slightly outwardly at its moment of seating and provides a much easier entry than is obtainable for the slat packs of conventional chains. The seating vibration and whip usually experienced with conventional chains of this slat pack type are materially dampened as a result of this easier entry.

Therefore, a still further important object of this invention is to provide a novel form of chain joint structure and articulation action which will effect a material improvement in the seating of slat packs for side engaging chains.

Other objects and advantages of the invention will be apparent during the course of the following description.

Figure 2:
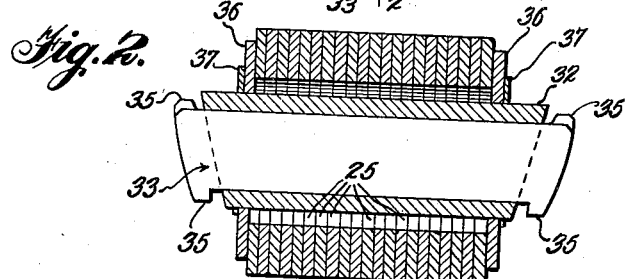
Figure 3:
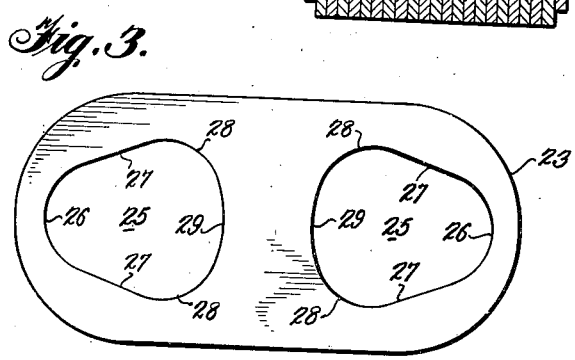
Figure 4:
Figure 5:
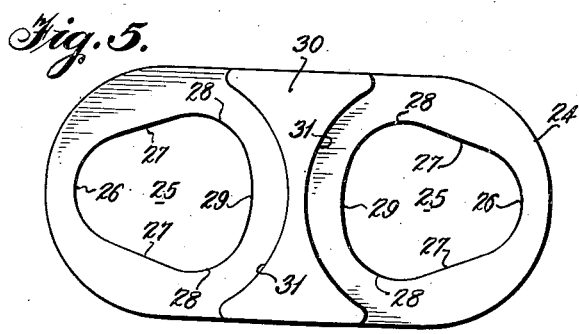

In the accompanying drawings forming a part of this specification and in which like numerals are employed to designate like parts throughout the same:

Figure 1 is a fragmentary top plan view of a power transmission chain of the type embodying this invention and illustrates two chain links which are pivotally joined by the cage or frame of a slat pack, Figure 2 is a transverse, vertical sectional view taken on line 2—2 of Fig. 1, Figure 3 is a detail side elevational view of a regular chain link plate which forms a part of one of the links of Fig. 1, Figure 4 is an end elevational view of the link plate disclosed in Fig. 3, Figure 5 is a detail side elevational view of a special form of link plate which carries an articulation controlling lug. A suitable number of these special link plates is incorporated in each link of Fig. 1, Figure 6 is an end elevational view of the link plate disclosed in Fig. 5, Figure 7 is a side elevational view of a section of chain of the type disclosed in Figs. 1 and 2 and illustrates four pivotally connected links arranged in two different articulation angles to show how the slat packs are affected by these two different kinds of articulation, Figure 8 is a partly side elevational view and partly diagrammatic view of the chain structure disclosed in Fig. 7 and will be employed in describing what takes place as a result of articulation of the links in opposite directions, Figure 9 is a partly side elevational view and partly diagrammatic view of three links articulated in the same direction as distinguished from the opposite directions of articulation disclosed in Fig. 8, Figure 10 is a side elevational view of a single link plate of the type disclosed particularly in Figs. 7 to 9, inclusive, with slat pack cages or frames arranged in the pitch holes of the link and further illustrating three hypothetical points which will be employed in describing the joint or articulation action of this chain and the seating action of the slat packs, Figure 11 is a diagrammatic or schematic view which illustrates the seating of a slat pack, Figure 12 is a diagrammatic or schematic view of a chain of the type embodying this invention and will be employed in explaining the reasons why equilibrium is quickly established and the utmost in stability is obtained with this type of chain structure, Figure 13 is a view similar to Fig. 12 but illustrates the reasons for the instability and the difficulty of establishing equilibrium with conventional chains, Figure 14 is a detail side elevational view of a modified form of special link plate which includes an articulation controlling lug, Figure 15 is a top plan view of the link plate disclosed in Fig. 14, Figure 16 is a detail vertical sectional view taken on line 16—16 of Fig. 14, Figure 17 is a side elevational view, similar to Fig. 7, but illustrating a further modified form of articulation controlling structure, Figure 18 is a side elevational view of one form of link plate employed in the chain structure disclosed in Fig. 17, Figure 19 is a longitudinal sectional view, taken on line 19—19 of Fig. 18, Figure 20 is a top plan view of another form of link plate employed in the chain of Fig. 17, Figure 21 is a side elevational view of a section of chain which includes a modified form of combined slat pack cage or frame and chain pin with a cooperating modified form of pitch hole for the said pin, and Figure 22 is a view similar to Fig. 21 but illustrates a further modified form of combined slat pack cage or frame and chain pin with a cooperating modified form of pitch hole to receive the said pin.

In the drawings, wherein for the purpose of illustration are shown the preferred embodiments of this invention, and first particularly referring to Figs. 1 to 7, inclusive, the reference character A designates two chain links which are pivotally connected at their adjacent, overlapped ends by means of a joint structure B. Each one of these chain links is formed by assembling a suitable number of the link plates 23, shown in detail in Figs. 3 and 4, and a suitable number of link plates 24, shown in detail in Figs. 5 and 6. Fig. 1 discloses each link A as having two link plates 24 at each outer side thereof while the remainder of the link is formed of link plates 23. It is to be understood, however, that a greater number of link plates 24 may be employed if desired and that these link plates 24 may be distributed at suitable intervals throughout the width of a link instead of being arranged entirely at the opposite outer sides of a link.

In Figs. 3 and 5, both link plates 23 and 24 are disclosed as having formed in their opposite end portions the peculiarly shaped pitch holes 25. Each one of these pitch holes is of somewhat triangular shape and includes an arcuate bearing surface 26 which lies adjacent the end of the link plate. These arcuate bearing surfaces are less than a half circle. The opposite side edges 27 diverge for a portion of their length and are tangentially arranged with respect to the circle from which the arcuate bearing surface 26 is taken. These flat or straight, diverging side edges merge into arcuate corner portions 28 which in turn blend into an arcuate inner edge 29 that is struck from the same center as the arcuate bearing surface 26 but, of course, with a greater radius.

Figure 6:
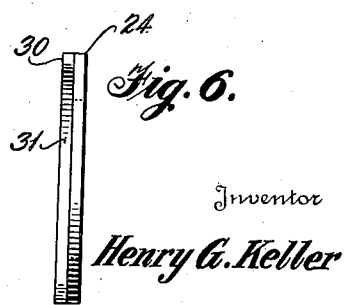

The link plate 24 shown in Figs. 5 and 6 differs from link plate 23 by having a laterally projecting, double curved lug 30 formed thereon. This lug may be separately formed and attached to the side face of the main body of the plate 24 or the thickness of the middle portion of the plate may be increased a suitable amount to provide this lug. The opposite sides 31 of this lug 30 are curved or arcuate with their centers located on the center line of the link plate between the points where the said center line intersects the arcuate bearing surface 26 and opposed arcuate surface 29 of the respective pitch holes 25. As will be explained at a later point, this lug 30 functions to control the joint or articulation action of the link plates which lie in the plane of the lug and which have their curved ends bearing against the curved or arcuate sides 31 of the lug.

Referring now particularly to Figs. 1 and 2, it will be seen that the pitch holes of the overlapped link plates 23 and 24 for the two links A have arranged therein a cage or frame 32 which is hollow or of tubular formation and has positioned in its bore the slat pack 33. This slat pack consists of the conventional regular slats, key slats, and end retaining slats which will not be specifically described. Each pack is provided on each side or end with the special slats 34 in the conventional manner. When properly assembled in the cage 32, the various slats of the pack are permitted to partake of limited transverse movement relative to the length of the cage and the extent of this transverse movement is determined by the ears 36 carried by the slats. The various link plates 23 and 24 which form the pivotally connected links A are maintained in proper assembled position on the cage 32 by the retaining washers 35 and the split spring clips 37 which have their opposite sides received in notches 38 formed in the sides of the cage 32, as is best illustrated in Fig. 7 at the extreme right thereof.

By inspecting Fig. 7, it will be seen that the several cages 32 illustrated therein are provided with arcuate side surfaces 39 which cooperate with the arcuate surfaces 26 and 29 of the pitch holes 25 for the overlapped ends of the several link plates. Due to the arrangement of the pitch holes 25 in the end portions of the link plates, the bearing surfaces 26 of all of the link plates of one link will be arranged in transverse alignment with the surfaces 26 of all of the link plates of the other link of any given joint. The side bearing surfaces 39 of any given cage 32, therefore, will directly bear against the bearing surfaces 26 of all of the link plates of both links at a given joint and the links will fulcrum about their pitch hole bearing surfaces 26 and will move lengthwise of the restraining surfaces 29. As the pitch hole surfaces 29 lie opposite the pitch hole bearing surfaces 26, the cage bearing surfaces 39 will shift along the pitch hole surfaces 29 when two links articulate with respect to each other. In addition to having the arcuate bearing surfaces 39 at their opposite sides, the cages 32 are provided with flat top and bottom surfaces 40. These flat top and bottom surfaces 40 cooperate with the flat edges 27 of the link plate pitch holes to limit the angle of articulation of pivotally connected links. The pitch holes disclosed in Figs. 3, 5, and 7 have their straight edge portions 27 diverging at a suitable angle to provide a maximum articulation angle of 40° for these links. By inspecting Fig. 7, it will be seen that the tubular members 32 function as both cages or frames for the slat packs 33 and chain pins for pivotally connecting adjacent links.

Figs. 8 to 13, inclusive, will be employed in describing the joint action or articulation of the links; the manner in which equilibrium is quickly established when the links are running onto a pulley to provide the maximum in stability; the manner in which the articulation pitch is shortened relative to the actual pitch of the chain links to provide smoother chain action as a result of modified chordal action, and the reason why an easier entry of the slats is obtained as a result of dampening seating vibration and whip.

Fig. 10 first will be referred to in connection with this explanation of the joint action or articulation of the links. In this figure there is disclosed one link with its two peculiarly shaped pitch holes 25 and a combined pack cage and chain pin 32 is illustrated as being arranged in each one of the two pitch holes. Each one of these cage-pin members 32 has associated therewith three hypothetical points which are designated by the legends "point 1," "point 2," and "point 3." In the disclosure of Fig. 10, the illustrated link is traveling from right to left or with "point 1" leading. This "point 1" for the left-hand cage-chain pin coincides with the center of the arcuate bearing surface 26 and the arcuate surface 29 of the pitch hole 25 in which this cage-chain pin is positioned. This "point 1" also coincides with the center for the arcuate bearing surface 39 of the side of the cage-chain pin which engages the bearing surface 26 of this particular pitch hole. For this same left-hand cage-chain pin, "point 3" corresponds with the center of the arcuate surface 39 formed on the right-hand side of the cage-chain pin being considered. "Point 2" of this left-hand cage-chain pin lies halfway between "point 1" and "point 3."

The cage-chain pin 32 positioned in the right-hand pitch hole 25 of this link has its three different "points" but as this end of the illustrated link plate is the trailing end, the points bear a different numerical relation with respect to the various arcuate surfaces. For example, "point 3" coincides with the center for the two arcuate surfaces 26 and 29 of this pitch hole and the center for the arcuate surface 39 of the cage-chain pin which cooperates with the pitch hole bearing surface 26. "Point 1" coincides with the center of the arcuate bearing surface 39 of the cage-chain pin which cooperates with the pitch hole surface 29. "Point 2," however, bears the same relationship as "point 2" for the other cage-chain pin.

These three points are joined by a dotted line 41 which will be referred to hereinafter as the center line of the cage-chain pin.

We shall now refer to Fig. 11 which illustrates the seating of a slat pack which is traveling in the direction of the arrow line 42 of this figure. This seating action will be explained by tracing the paths of movement of the three points 1, 2, and 3 during engagement of a slat pack.

In this illustration, line 43 may be considered as representing the pitch circle of the wheel onto which the slat pack is running. The outer line 44 cooperates with the pitch circle line 43 to represent the engaging depth of the pack. Arrow 45 represents the direction of approach of a slat pack with respect to a wheel, and this arrow will coincide with the center line 41 of the approaching pack.

The dotted line has been designated as the "path of point 1 during engagement." This is the point which first engages or reaches the pitch circle 43 and indicates the point of first engagement of the slat pack with the teeth of the wheel faces on which the pack is running. It will be noted that this point travels in the direction of the arrow line 45 until it reaches its point of engagement with the pitch circle. This "point 1," because it seats first, acts as a fulcrum or swinging point during the further articulation of the joint. From its first point of engagement, this "point 1" gradually moves outwardly on a gradually ascending curve until the entire pack is fully seated, at which time "point 1" lies outwardly of the pitch circle 43, or as is illustrated at the extreme left of Fig. 11.

The solid line has been designated as the "path of point 2 during engagement." It will be noted that at the instant that "point 1" reaches the pitch circle 43, "point 2" starts from its then occupied position and follows a gradually descending curve to its point of full engagement which is shown at the left of Fig. 11. When "point 2" is fully engaged, it coincides with the pitch circle 43.

The dash line has been designated as the "path of point 3 during engagement." This "point 3"

starts at the moment of engagement of "point 1" with the pitch circle and follows a gradually descending curve until this "point 3" is fully engaged. This "point 3" approaches the pitch circle 43 but ordinarily does not engage to this depth.

It was stated above that "point 1" initially acts as a fulcrum or swinging point during the early part of the articulation of the joint. However, during the seating movement of "point 2" and "point 3" the joint fulcrum moves from "point 1" to "point 2." This compound joint fulcrum results from the gradual ascending movement of the "point 1" away from the pitch circle 43. This gradually ascending curve followed by "point 1" is responsible for the easy entry or engagement of the slat pack with the wheel face and is unconventional. During the engagement of a slat pack of conventional design; i. e., where the slat pack is located between the chain pins and at the center of a link chord, all three points follow the gradually descending curves which are illustrated as the paths for "point 2" and "point 3."

Figs. 8 and 9 now will be referred to for the purpose of explaining the manner in which the chain links articulate about compound centers and effect a shortening of the articulated pitch with respect to the normal pitch.

In these two Figs. 8 and 9, articulation angles of 40° are illustrated. As was stated above, this is the maximum angle of articulation which is permitted by the divergent edges 27 of the pitch holes. In actual use, a 40° articulation angle is never required. These exaggerated angles have been adopted solely to aid in disclosing the joint action. In these two figures, the outline only of the involved cage-chain pins is illustrated. In Fig. 8, the two center links are arranged with their center lines coextensive. The two outer links, however, are articulated at 40° in opposite directions. The links of this type of chain are never required to articulate in these two opposite directions as a result of running over sprockets. Fig. 9 illustrates three links articulated in the same direction, and this is the direction of articulation required for running around sprockets. However, when tensioning mechanism is employed which produces a sag in the non-driving run of the chain, the links are required to articulate in the opposite direction to the direction of articulation required while running around sprockets. For this reason, Fig. 8 illustrates articulation in opposite directions.

The center, or unarticulated, joint of Fig. 8 has associated therewith the three points of Fig. 10. In this Fig. 8, the points will be designated by the reference characters P1, P2, and P3. The center line 41 also is illustrated. These points P1 and P3 may be considered as possible fulcrum points for the two links which are joined together by this center cage-chain pin 32. If these two center links were permitted to fulcrum about only one of these points P1 and P3, one curved bearing surface 39 of the cage-chain pin would move relative to its associated arcuate surfaces 29 of the pitch holes while the remaining bearing surface 39 of the cage-chain pin would remain stationary with respect to its arcuate pitch hole surfaces 29. The maximum limit of articulation, then, would be only 20° before a straight pitch hole edge 27 would be encountered. If the links were further articulated, the second of the two fulcrum points P1 and P3 would come into play and the second bearing surface 39 of the cage-chain pin would move relative to its arcuate pitch hole surface 29. It will be seen from this description that without some form of control for the articulation of the links, they would be permitted to articulate about either of two centers or fulcrum points or they would be permitted to fulcrum or articulate first about one point and then about another point. The articulation controlling lugs 30 with their curved surfaces 31 are provided for controlling this articulation or joint action so that the links will articulate to an equal extent or degree about both of the points P1 and P3. By engaging the end edges of the link plates which lie in the planes of the lugs 30, the curved surfaces 31 of these lugs cause the links to articulate about compound centers. As a result of this compound action, the cage-chain pin of two articulated links has its center line 41 articulated in one direction when the links are articulated in the opposite direction and the angle of articulation of the cage-chain pin center line is exactly one-half the angle of articulation of the chain links. Therefore, when the chain links are articulated 40°, the center line of the involved cage-chain pin articulates only 20°. This difference in degree and direction of articulation causes the center line of the cage-chain pin to bisect the articulation angle of the chain links. This bisecting of the articulation angle is illustrated in Fig. 9. Figs. 8 and 9 also illustrate the 20° angle of articulation of the cage-chain pins for the 40° articulation angle of the chain links. Fig. 8 illustrates in connection with the right-hand link that fulcrum point P3 remains fixed with respect to the center line of one chain link while fulcrum point P1 remains fixed with respect to the other chain link center line. This same condition is illustrated in connection with the pivoted link at the left of Fig. 8.

It will be appreciated that the normal pitch of a chain link extends between the points P2 of the two cage-chain pins received in its pitch holes or, stated in another way, the normal pitch of a link is equal to the distance between the two points P2 of its two cage-chain pins when no articulation is involved.

Fig. 9 illustrates hypothetical triangles 46 which are formed by the center lines of the cage-chain pins and the center lines of the articulated links. Two apexes of these triangles coincide with the fulcrum points P1 and P3. The third apex of these hypothetical triangles 46 is designated by the reference character 47. The distance between these two apexes 47 represents the articulated pitch of the chain links. It will be obvious to anyone from an inspection of Figs. 8 and 9 that this articulated pitch is shorter than the normal pitch, or the distance between two points P2 when no articulation is involved. This shortening of the articulation pitch, of course, results from articulation of the links about compound centers. Of course, the extent to which the articulated pitch is shortened relative to the actual pitch is dependent upon the articulation angle. The greater the angle of articulation, the shorter the articulated pitch.

Figs. 12 and 13 next will be referred to for the purpose of explaining why conventional power transmission chains of the slat pack, side engaging type are so unstable and why the slat pack, side engaging chains embodying this invention possess such a high degree of stability.

Fig. 13 represents a conventional chain of the slat pack type and will be referred to first. The lines 48 may be considered as representing the links or the chords of the links which are pivotally connected by the chain pins 49. In conventional chains of this type, the slat packs are centrally located with respect to the chain links 48 or their chords. The slat packs with their cages are represented by the character 50. The ends of the slats contact the opposed conical faces of the pairs of wheels which form the V-pulleys over which the chain runs. It is the tension forces applied to the chain which cause the ends of the slats to contact the wheel faces. Every such chain assembly includes a strand of the chain which is loaded and a strand of the chain which is unloaded or slack. The loaded strand of the chain, naturally, applies a high degree of tension to the links running around the wheel faces. Some form of tensioning means is usually employed with this type of transmission which will apply a slack maintaining force to the unloaded or slack strand of the chain. This slack maintaining tension is applied to the chain links running around the sprocket wheel but this slack tension is applied in the opposite direction to the direction of application of the load tension. These oppositely working tension forces will be represented by the arrows 51 and 52. Of course, the direction of rotation of the wheel and whether the wheel is driving or being driven will determine which one of these two arrows represents the slack tension and which one represents the load tension. We shall assume, however, that arrow 51 represents the slack tension while arrow 52 represents the load tension. Under normal working conditions, the slack tension load is only approximately 40% of the working tension load. It will be apparent, therefore, that the slack tension appled to each chain pin 49 in the direction of arrow 51 will normally only be approximately 40% of the tension applied to each chain pin 49 in the direction of the arrow 52. As these slack and load tension forces maintain the ends of the slats in contact with the faces of the pulley wheels, these pulley wheels will offer resistance to the tension forces applied to the chain links and their packs. This resistance or reaction provided by the wheels will be represented by the arrow lines 53 applied to each slat pack. These reaction forces are applied to the chain links, or their chords, 48 at points intermediate the chain pins 49. It will be apparent, therefore, with a 100% tension force applied to one chain pin and a 40% tension force applied to the other chain pin, the chain links naturally will tend to rock about the points of engagement of the ends of the slats with the working faces of the wheels. This rocking continues until a state of equilibrium is established. The establishment of equilibrium is a relatively slow procedure with this type of conventional chain, and its accomplishment is rendered more difficult by the fact that as the chain links progress around the wheels, the opposed tension forces applied to each link vary.

Referring now to Fig. 12, the various chain links are represented by the lines 54. These lines 54, also, are representative of the chords of the links. The reference numeral 32 will be applied to the combined cage and chain pins. The points of pivotal connection between the link or chord lines 54 and the cage-chain pins 32 correspond with points P1 and P3 of Figs. 8 to 10, inclusive. The arrow 55 will represent the slack tension forces while the arrow 56 will represent the work imposed tension forces. The arrow lines 57 will represent the resistance or reaction offered by the engagement of the slat ends with the faces of the wheels.

As has been explained above, each one of the chain links has a pitch hole bearing surface 26 adjacent each one of its ends, and these bearing surfaces cooperate with bearing surfaces 39 formed on the sides of the cage-chain pins 32. The cooperating bearing surfaces 26 and 39 are formed on a common center, and these centers are represented by the points P1 and P3. The relative pivotal movements between the links and the cage-chain pins, therefore, occur about these points P1 and P3.

By tracing out the lines 54, which represent the several links or their chords, it will be seen that each link or chord line extends from a point P1 of one of its cage-chain pins 32 to the point P3 of its other cage-chain pin 32. These points P1 and P3, also, are the outer points of the respective cage-chain pins 32. As the links are prevented from partaking of unequal pivotal movement about the points P1 and P3 by the articulation controlling lugs 30, the links are not permitted to rock with respect to the cage-chain pins 32 and these cage-chain pins are not permitted to rock with respect to the chain links. Therefore, the unequal tension forces applied to the points P1 and P3 by the links attached thereto will not cause any rocking action of any of the parts and equilibrium will be established as soon as the resistance or reaction forces are applied to the slat packs by engagement of the slat ends with the wheel faces, said resistance or reaction forces being represented by the arrow lines 57. This instantly established equilibrium will be maintained throughout the entire run of a link around a wheel and regardless of variations in the tension forces which occur as a result of a link progressing around a wheel. It will be obvious, therefore, that the utmost in stability will be provided with this improved form of chain structure.

Referring next to Figs. 14 to 16, inclusive, there is disclosed a chain link plate 24a which differs from the link plate 24 of Figs. 5 and 6 only by being provided with a different type of articulation controlling lug. This link plate 24a is provided with controlling lugs 30a which are cut from and pressed into offset relationship with respect to the body of the link plate. These three figures clearly illustrate how these controlling lugs are formed. The link plate 24a is provided with the same form of pitch hole 25 as is disclosed in Figs. 3 and 5.

Figs. 17 to 20, inclusive, disclose a modified form of chain which includes a different form of joint articulation controlling means which performs the additional function of interlocking the overlapping end portions of chain link plates to relieve the cage-chain pins of compression forces.

Each one of the two links C of Fig. 17 is formed of an outside link plate 58 at each of its two sides. This type of outside link plate is disclosed in detail in Fig. 20. The remainder of these two links C is formed of inside link plates 59. These inside link plates are disclosed in detail in Figs. 18 and 19. The remaining links D of Fig. 17 are formed entirely of the inside links 59.

By first referring to Figs. 17 and 20, it will be seen that each outside link plate 58 is provided with the same form of pitch hole 25 as has been disclosed in Figs. 3, 5, and 14, as well as such other figures as 7 to 10, inclusive. Both end portions of these outside links are provided with lugs 60 which project laterally of their inner faces. These lugs have relatively short inner and outer faces which are arcuate and which are struck from the centers of their adjacent pitch holes 25.

Figs. 17, 18, and 19 disclose the inside link plates 59 as having arcuate channels or grooves 61 formed in one face thereof, and extending around the wider, inner ends of their pitch holes 25. These channels or grooves 61 are struck from the centers of their respective pitch holes. The opposite faces of these inside link plates 59 are provided with lugs 60 which are arranged in the same manner and are of the same shape as the lugs 60 carried by the outside link plates 58.

When these link plates are properly assembled to form the complete links C and D, the lugs 60 of all of the plates of each link are received in the channels or grooves 61 of the inside link plates 59 which are arranged in overlapping relation therewith. It will be seen, therefore, that these interlocked lugs 60 and grooves or channels 61 will control the joint action or articulation of the links to the same extent and for the same purpose as the controlling lugs 30 of Figs. 5 and 6 and the controlling lugs 30a of Figs. 14 to 16, inclusive. Additionally, these interlocked lugs 60 and channels or grooves 61 will relieve the cage-chain pins 32, see Fig. 17, of all compression forces. This chain of Fig. 17 in all other respects will operate the same as the previously described chain.

Fig. 21 discloses a further modified form of chain. The modification represented by this chain resides entirely in the shape of the pitch holes 25a and the shape of the cage-chain pins 32a. Otherwise, the construction and operation is the same as that described in connection with Figs. 1 to 12, inclusive. In this chain, the pitch holes 25a of the link plates 62 and 63 are provided with full half circle bearing surfaces 26a instead of the less than half circle bearing surfaces 26 of the previously described pitch holes 25. The opposite side portions of the cage-chain pins 32 are also provided with full half circle bearing surfaces 39a which cooperate with the half circle bearing surfaces 26a. The chain link side plates 63 are provided with the joint action or articulation controlling lugs 30 with their arcuate surfaces 31, the same as was described in connection with Figs. 5 and 6.

Fig. 22 discloses a still further modified form of chain structure. The modification embodied in this chain deals with the shape of the pitch holes 25b, the shape of the cage-chain pins 32b, and the shape of the joint action or articulation controlling lugs 30b. Otherwise, the chain is of the same construction and, notwithstanding the differences in shape of these three elements, the chain will function in identically the same manner as the chain described in connection with Figs. 1 to 12, inclusive, etc.

Coming first to the shape of the pitch holes 25b, it will be noted that the pitch holes 25 and 25a of the several preceding figures had concaved, arcuate bearing surfaces 26 and 26a, respectively, at their outer ends. The pitch holes 25b of Fig. 22, however, have convexed, substantially half-circle bearing surfaces 26b at their outer ends. The cage-chain pins 32b are shaped at their sides so as to provide concaved bearing surfaces 39b which receive the bearing surfaces 26b of the pitch holes. The remainder of the side walls of the cage-chain pins are provided with arcuate surfaces 64 which cooperate with the arcuate walls 65 of the pitch holes 25b.

The lugs 30b are provided with side surfaces 31b which lie in the plane of and engage the curved end surfaces of the adjacent links to control the articulation of the links. In this type of structure, the centers for the cooperating bearing surfaces 26b and 39b constitute the points P1 and P3 of Figs. 8 to 12, inclusive.

It is to be understood that the description of the joint action or articulation, the seating of the slat packs with respect to the faces of the pulley wheels and the stability of chains embodying this invention given in connection with Figs. 8 to 13, inclusive, apply with equal force to the various modified forms of chains disclosed in detail in Figs. 14 to 22, inclusive. It should be unnecessary, therefore, to repeat this lengthy description for each one of these modifications.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a chain pin received in each aligned set of pitch holes and having its outer sides formed with curved bearing surfaces, formed on spaced centers, which cooperate with the curved bearing surfaces of the pitch holes receiving the same, and means operatively associated with link plates of adjacent links for compelling the said links to articulate equally about the spaced centers of said chain pin bearing surfaces.

2. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, and a chain pin received in each aligned set of pitch holes and having its outer sides formed with curved bearing surfaces, struck from spaced centers, which cooperate with the curved bearing surfaces of the pitch holes receiving the same for pivotally connecting the adjacent links, said curved bearing surfaces of the chain pin being spaced from each other a distance which is greater than the sum of the radii of said surfaces.

3. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side and a curved restraining surface at its inner side, said curved bearing and restraining surfaces of each pitch hole being struck from the same center but with different radii and different lengths, and a chain pin received in each aligned set of pitch holes and having its outer sides formed with curved bearing surfaces, struck from spaced centers, which cooperate with the curved bearing and restraining surfaces of the pitch holes for pivotally connecting the adjacent links.

4. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side and a curved restraining surface at its inner side, said curved bearing and restraining surfaces of each pitch hole being struck from the same center but with different radii and different lengths, a chain pin received in each aligned set of pitch holes and having its outer sides formed with curved bearing surfaces, struck from spaced centers, which cooperate with the curved bearing and restraining surfaces of the pitch holes for pivotally connecting the adjacent links, and means operatively associated with link plates of adjacent links for compelling said adjacent links to articulate equally about the spaced centers of the chain pin bearing surfaces.

5. In a power transmission chain, a plurality of links, each one of which is formed of a set of parallel link plates with the end portions of adjacent sets of link plates overlapped, means for pivotally connecting adjacent links for articulation about two spaced centers, and means carried by at least certain of said adjacent link plates for compelling the adjacent links to articulate equally about said two centers.

6. In a power transmission chain, a plurality of links, each one of which is formed of a set of parallel link plates with the end portions of adjacent sets of link plates overlapped, means for pivotally connecting adjacent links for articulation about two spaced centers, means for compelling the adjacent links to articulate equally about said two centers, said pivotally connecting means comprising aligned pitch holes in the overlapped end portions of the link plates with the respective sets of plates having curved bearing surfaces arranged on opposite sides of the aligned pitch holes, and a chain pin received in the aligned pitch holes of adjacent links and having curved bearing surfaces formed on its opposite sides which are provided with spaced centers and which cooperate with the bearing surfaces arranged on the opposite sides of the aligned pitch holes.

7. In a power transmission chain, a plurality of links, each one of which is formed of a set of parallel link plates with the end portions of adjacent sets of link plates overlapped, means for pivotally connecting adjacent links for articulation about two spaced centers, and means for compelling the adjacent links to articulate equally about said two centers, said means for compelling equal articulation of the links about said two centers comprising cooperating curved surfaces formed on link plates of adjacent links which have their centers located halfway between the two spaced centers about which the two links articulate.

8. In a power transmission chain, a plurality of links, each one of which is formed of a set of parallel link plates with the end portions of adjacent sets of link plates overlapped, means for pivotally connecting adjacent links for articulation about two spaced centers, means for compelling the adjacent links to articulate equally about said two centers, said pivotally connecting means comprising aligned pitch holes in the overlapped end portions of the link plates with the respective sets of plates having curved bearing surfaces arranged on opposite sides of the aligned pitch holes, and a chain pin received in the aligned pitch holes of adjacent links and having curved bearing surfaces formed on its opposite sides which are provided with spaced centers and which cooperate with the bearing surfaces arranged on the opposite sides of the aligned pitch holes, said means for compelling equal articulation of the links about said two centers comprising cooperating curved surfaces formed on link plates of adjacent links which have their centers located halfway between the two spaced centers about which the two links articulate.

9. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a chain pin received in each aligned set of pitch holes and having its outer sides formed with curved bearing surfaces, formed on spaced centers, which cooperate with the curved bearing surfaces of the pitch holes receiving the same, and means operatively associated with link plates of adjacent links for compelling the said links to articulate equally about the spaced centers of said chain pin bearing surfaces, and for relieving the chain pin of compression forces.

10. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side and a curved restraining surface at its inner side, said curved bearing and restraining surfaces of each pitch hole being struck from the same center but with different radii and different lengths, a chain pin received in each aligned set of pitch holes and having its outer sides formed with curved bearing surfaces, struck from spaced centers, which cooperate with the curved bearing and restraining surfaces of the pitch holes for pivotally connecting the adjacent links, and means operatively associated with link plates of adjacent links for compelling said adjacent links to articulate equally about the spaced centers of the chain pin bearing surfaces, and for relieving the chain pin of compression forces.

11. In a power transmission chain, a plurality of links, each one of which is formed of a set of parallel link plates with the end portions of the link plates of adjacent sets overlapped, said overlapped end portions of the link plates having transversely aligned pitch holes formed therein, a tubular chain pin loosely received in said aligned pitch holes and bodily swingable relative thereto for pivotally connecting adjacent links, and a slat pack positioned in the bore of said tubular chain pin with the individual slats of said pack supported by and bearing directly against the inside wall of the pin for limited transverse movement in either direction.

12. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a tubular chain pin received in each aligned set of pitch holes, and having its outer sides formed with curved bearing surfaces, struck from spaced centers, which cooperate with the curved bearing surfaces of the pitch holes receiving the same for pivotally connecting adjacent links, and a slat pack positioned in the bore of each tubular chain pin with the individual slats of said pack supported by said bore for limited transverse movement in either direction.

13. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a tubular chain pin received in each aligned set of pitch holes and having its outer sides formed with curved bearing surfaces, struck from spaced centers, which cooperate with the curved bearing surfaces of the pitch holes receiving the same, means operatively associated with link plates of adjacent links for compelling the adjacent links to articulate equally about the spaced centers of said chain pin bearing surfaces, and a slat pack positioned in the bore of each tubular chain pin with the individual slats of said pack supported by said bore for limited transverse movement in either direction.

14. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side and a curved restraining surface at its inner side, said curved bearing and restraining surfaces of each pitch hole being struck from the same center but with different radii and different lengths, a tubular chain pin received in each aligned set of pitch holes and having its outer sides formed with curved bearing surfaces, struck from spaced centers, which cooperate with the curved bearing and restraining surfaces of the pitch holes for pivotally connecting the adjacent links, and a slat pack positioned in the bore of each tubular chain pin with the individual slats of said pack supported by said bore for limited transverse movement in either direction.

15. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side and a curved restraining surface at its inner side, said curved bearing and restraining surfaces of each pitch hole being struck from the same center but with different radii and different lengths, a tubular chain pin received in each aligned set of pitch holes and having its outer sides formed with curved bearing surfaces, struck from spaced centers, which cooperate with the curved bearing and restraining surfaces of the pitch holes for pivotally connecting the adjacent links, means operatively associated with link plates of adjacent links for compelling said adjacent links to articulate equally about the spaced centers of the chain pin bearing surfaces, and a slat pack positioned in the bore of each tubular chain pin with the individual slats of said pack supported by said bore for limited transverse movement in either direction.

16. In a power transmission chain, a plurality of links, each one of which is formed of a set of parallel link plates with the end portions of the link plates of adjacent sets overlapped, means for pivotally connecting the adjacent links for articulation about two spaced centers, means for compelling the adjacent links to articulate equally about said two centers, and a slat pack located within the pivotally connecting means.

17. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a concaved arcuate bearing surface at its outer side, a chain pin received in each aligned set of pitch holes and having its outer sides formed with convexed arcuate bearing surfaces, struck from spaced centers, which cooperate with the arcuate bearing surfaces of the pitch holes receiving the same, and means operatively associated with link plates of adjacent links for compelling the adjacent links to articulate equally about the spaced centers of said chain pin bearing surfaces.

18. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a convexed arcuate bearing surface at its outer side, a chain pin received in each aligned set of pitch holes and having its outer sides formed with concaved arcuate bearing surfaces, struck from spaced centers, which cooperate with the curved bearing surfaces of the pitch holes receiving the same, and means operatively associated with link plates of adjacent links for compelling the adjacent links to articulate equally about the spaced centers of said chain pin bearing surfaces.

19. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a half circle concaved bearing surface at each outer side, a chain pin received in each aligned set of pitch holes and having its outer sides formed with curved bearing surfaces, struck from spaced centers, which cooperate with the curved bearing surfaces of the pitch holes receiving the same, and means operatively associated with link plates of adjacent links for compelling the adjacent links to articulate equally about the spaced centers of said chain pin bearing surfaces.

20. In a power transmission chain, a pair of links, each one of which is formed of sets of link plates having their adjacent end portions overlapped, said overlapped end portions having aligned, non-circular pitch holes formed therein with each pitch hole having inner and outer curved bearing surfaces of unequal lengths, and a chain pin received in each of said aligned sets of pitch holes to fulcrum on the shorter one of the bearing surfaces of each pitch hole while moving lengthwise of the longer one.

21. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a chain pin received in each aligned set of pitch holes and having its outer sides formed with curved bearing surfaces which cooperate with the curved bearing surfaces of the pitch holes receiving the same, all of the aforesaid curved bearing surfaces of any given pitch hole and the chain pin received therein being struck from different centers, and means operatively associated with link plates of adjacent links for compelling the said links to articulate equally about the different centers of said chain pin bearing surfaces.

22. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being of substantially triangular formation and having curved inner and outer surfaces struck from the same center but with different radii, and a chain pin received in each aligned set of pitch holes and having its outer sides formed with curved bearing surfaces struck from spaced centers which cooperate with both of the curved inner and outer surfaces of the pitch holes receiving the same for pivotally connecting the adjacent links.

23. In a power transmission chain, a plurality of links, each one of which is formed of a set of parallel link plates with the end portions of adjacent sets of link plates overlapped, means for pivotally connecting adjacent links for articulation about two centers which are spaced from each other lengthwise of the chain, and with the articulation center for each link being the one which is outermost with respect thereto, and means for compelling the adjacent links to articulate equally about their respective centers so as to bring about a shortening of the articulation pitch of the chain.

24. In a power transmission chain, a plurality of links, each one of which is formed of a set of parallel link plates with the end portions of adjacent sets of link plates overlapped, means for pivotally connecting adjacent links for articulation about two centers which are spaced from each other lengthwise of the chain, and with the articulation center for each link being the one which is outermost with respect thereto, and means for compelling the adjacent links to articulate equally about their respective centers so as to bring about a shortening of the articulation pitch of the chain, said last mentioned means comprising cooperating curved surfaces formed on link plates of adjacent links with said curved surfaces lying outwardly of the pivotal connecting means.

25. In a power transmission chain, a plurality of links, each one of which is formed of a set of parallel link plates with the end portions of adjacent sets of link plates overlapped, means for pivotally connecting adjacent links for articulation about two centers which are spaced from each other lengthwise of the chain and with the articulation center for each link being the one which is outermost with respect thereto, and means for compelling the adjacent links to articulate equally about their respective centers and for relieving the pivotal connecting means of compression forces.

26. In a power transmission chain, a plurality of links, each one of which is formed of a set of parallel link plates with the end portions of adjacent sets of link plates overlapped, a tubular chain pin for pivotally connecting adjacent links for articulation about two centers which are spaced from each other lengthwise of the chain and with the articulation center for each link being the one which is outermost with respect thereto, means for compelling the adjacent links to articulate equally about their respective centers so as to bring about a shortening of the articulation pitch of the chain, and a slat pack positioned in the bore of said tubular chain pin.

27. In a power transmission chain, a plurality of links, each one of which is formed of a set of parallel link plates with the end portions of adjacent sets of link plates overlapped, a tubular chain pin for pivotally connecting adjacent links for articulation about two centers which are spaced from each other lengthwise of the chain and with the articulation center for each link being the one which is outermost with respect thereto, means for compelling the adjacent links to articulate equally about their respective centers so as to bring about a shortening of the articulation pitch of the chain, said last mentioned means comprising cooperating curved surfaces formed on link plates of adjacent links with said curved surfaces lying outwardly of the pivotal connecting means, and a slat pack positioned in the bore of said tubular chain pin.

28. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a tubular chain pin received in each aligned set of pitch holes and having its outer sides formed with curved bearing surfaces which cooperate with the curved bearing surfaces of the pitch holes receiving the same, all of the aforesaid curved bearing surfaces of any given pitch hole and the chain pin received therein being struck from different centers, means operatively associated with link plates of adjacent links for compelling the said links to articulate equally about the different centers of said chain pin bearing surfaces, and a slat pack positioned in the bore of said tubular chain pin.

29. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being of substantially triangular formation and having curved inner and outer surfaces struck from the same center but with different radii, a tubular chain pin received in each aligned set of pitch holes and having its outer sides formed with curved bearing surfaces struck from spaced centers which cooperate with both of the curved inner and outer surfaces of the pitch holes receiving the same for pivotally connecting the adjacent links, and a slat pack positioned in the bore of said tubular chain pin.

30. In a power transmission chain, a plurality of links, each one of which is formed of a set of parallel link plates with the end portions of the link plates of adjacent sets overlapped, said overlapped end portions of the link plates having transversely aligned pitch holes formed therein with each pitch hole being provided with a curved bearing surface at its outer side, a chain pin received in each aligned set of pitch holes and having its outer sides formed with curved bearing surfaces which cooperate with the curved bearing surfaces of the pitch holes receiving the same, all of the aforesaid curved bearing surfaces of any given pitch hole and the chain pin received therein being struck from different centers, and lugs carried by certain of the link plates of adjacent links and cooperating with end edges of other link plates of adjacent links for compelling the links to articulate equally about the different centers of said chain pin bearing surfaces.

HENRY G. KELLER.